Nov. 7, 1967 W. G. GRAINGER 3,351,103
APPARATUS FOR SEVERING, FEEDING, AND WELDING
A PREDETERMINED LENGTH OF WIRE
Filed Aug. 20, 1965 4 Sheets-Sheet 1
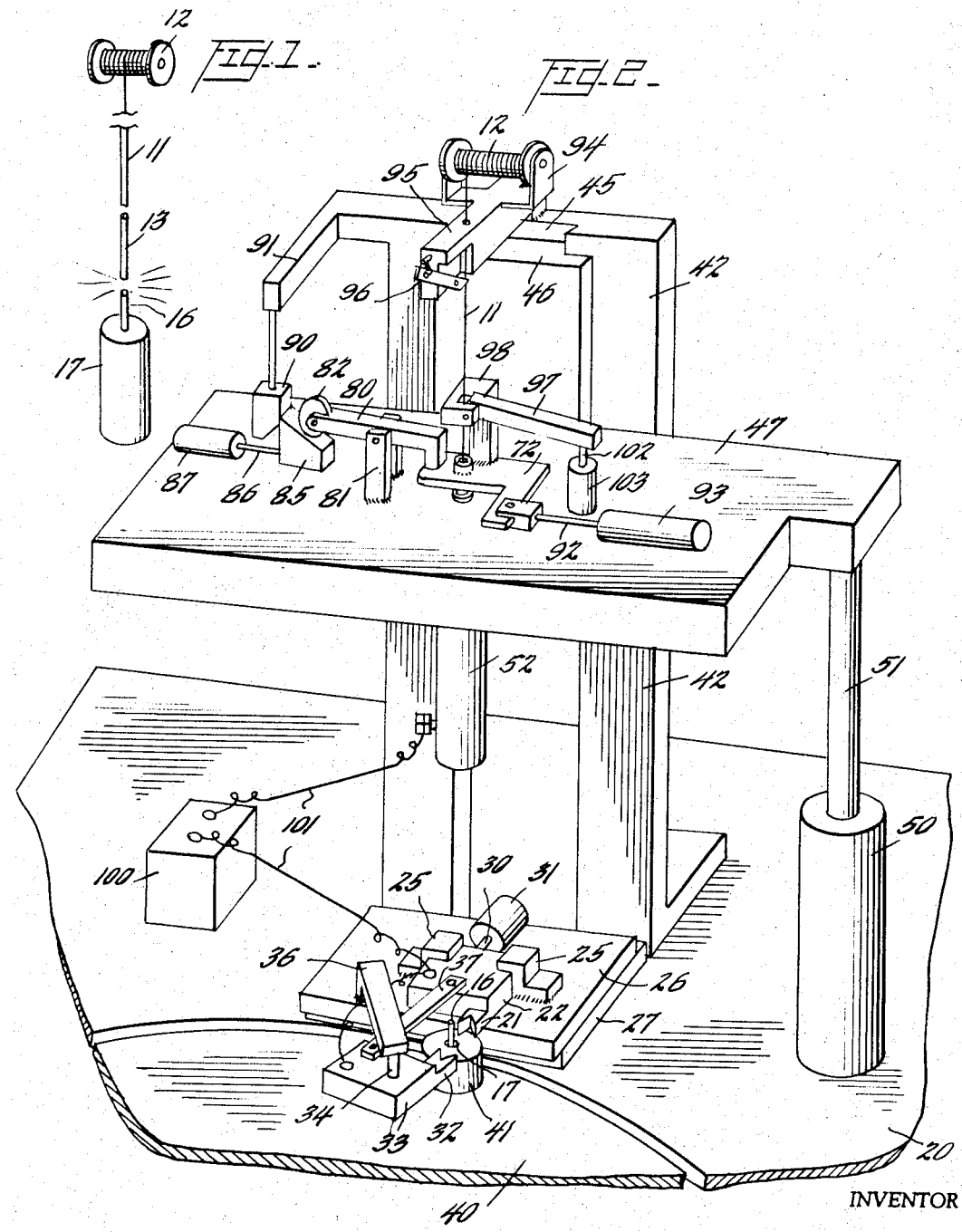
INVENTOR
W. G. Grainger,
BY S. Gundersen
ATTORNEY

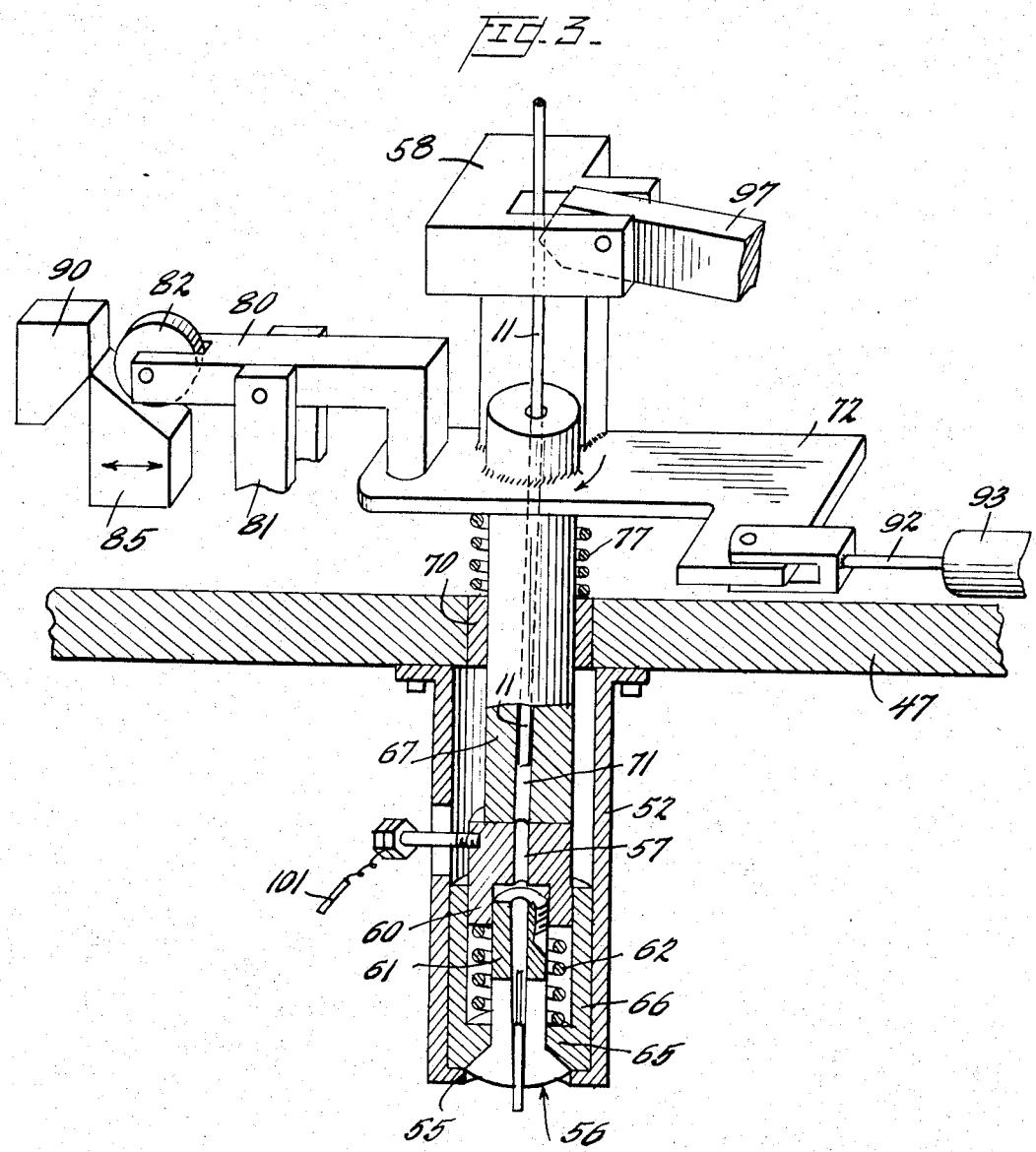

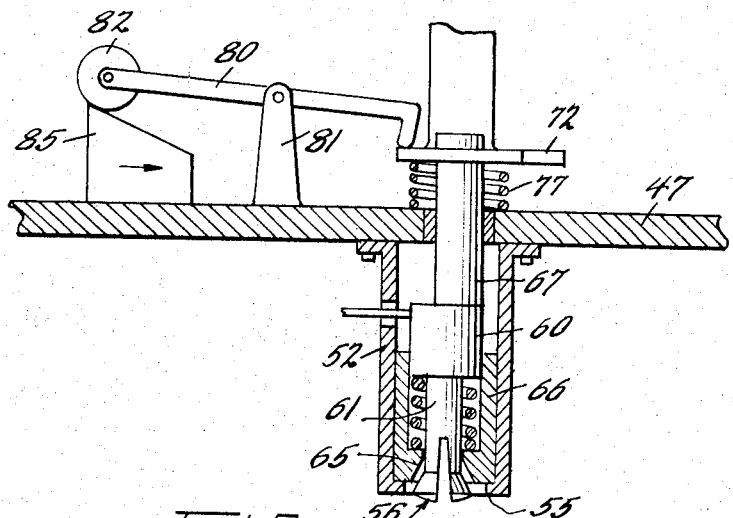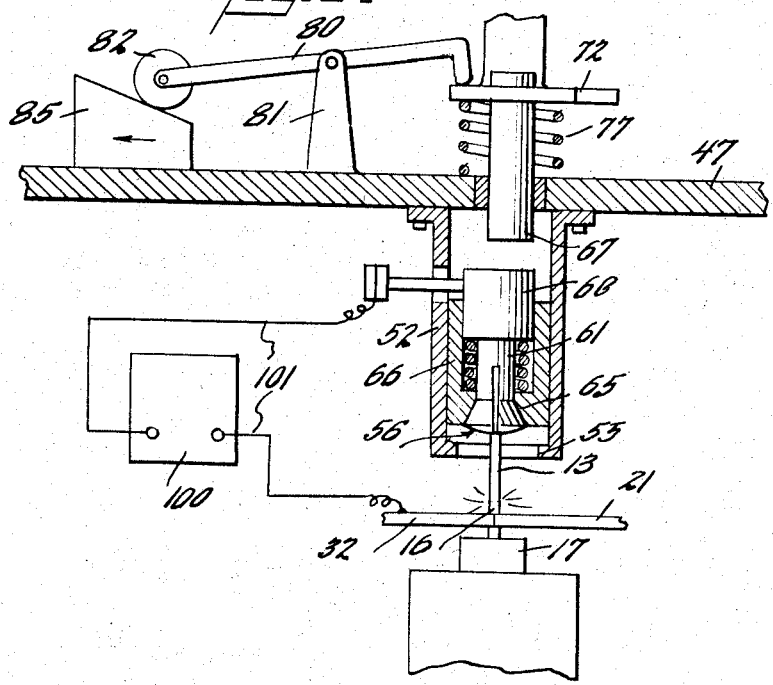

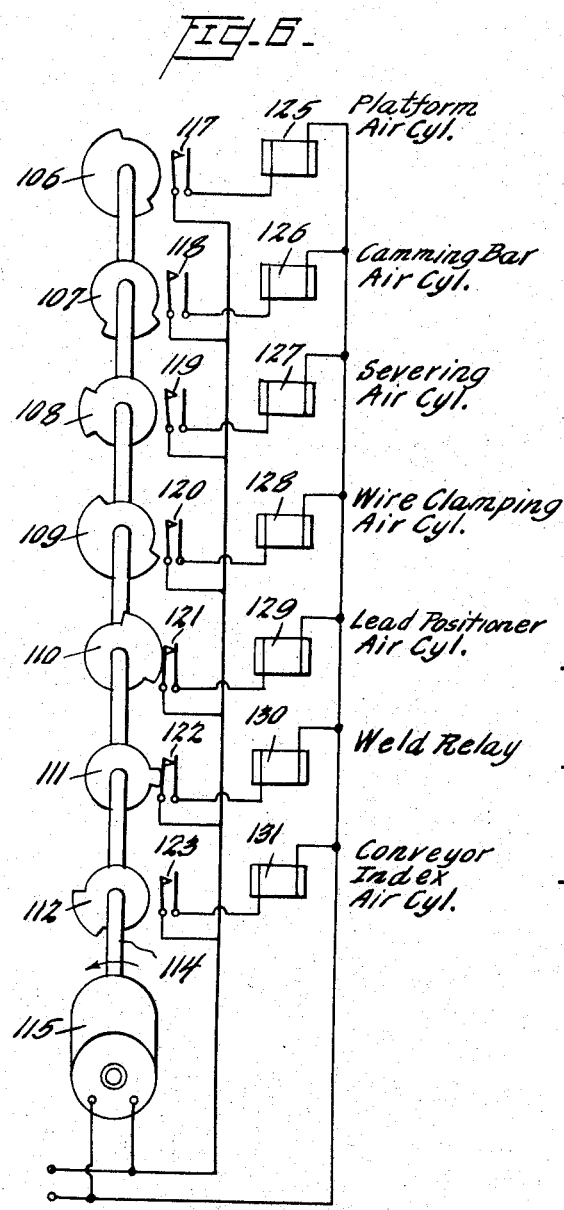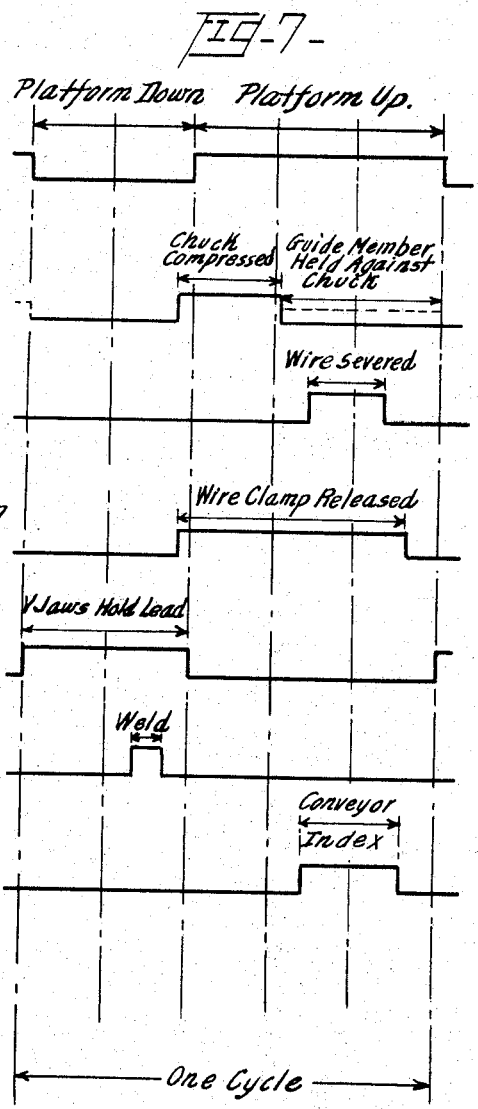

United States Patent Office 3,351,103
Patented Nov. 7, 1967

3,351,103
APPARATUS FOR SEVERING, FEEDING, AND WELDING A PREDETERMINED LENGTH OF WIRE
William G. Grainger, Winston-Salem, N.C., assignor to Western Electric Company, Incorporated, New York, N.Y., a corporation of New York
Filed Aug. 20, 1965, Ser. No. 481,326
8 Claims. (Cl. 140—112)

This invention relates to an apparatus for severing, feeding, and welding a predetermined length of wire and more particularly to an apparatus for severing a predetermined length of wire from the end of a supply of wire, advancing the severed wire into axial abutting relationship with an end of a terminal and welding the severed wire to the terminal.

In the manufacture of certain electrical components, such as tantalum capacitors, a predetermined length of thin nickel wire is butt welded to a thin tantalum wire lead extending from a sintered tantalum pellet. It is necessary while welding the predetermined length of wire to the wire lead to axially bias the wire against the lead with a controlled force.

Also, in order to automate the manufacturing facilities, it is expedient to automatically and cyclically sever predetermined lengths of wire from a wire supply and then to advance each severed wire into precise abutting relationship with a wire lead extending from one of a succession of intermittently advanced anodes.

Accordingly, it is an object of the present invention to provide an apparatus for automatically severing, feeding, and welding predetermined lengths of wire.

Another object of the invention is the provision of a slidably mounted welding chuck which biases and abuts an end of a thin wire against an end of a thin lead.

A further object of the invention resides in a rotatably and axially movable guide member which upon axial movement is effective to guide the end of a predetermined length of wire into a welding chuck and upon rotation severs the predetermined length of wire in the chuck.

With these and other objects in view, the present invention contemplates an apparatus for severing, advancing, and welding predetermined lengths of wire wherein a slidably mounted welding chuck grips, advances, and biases such length of wire against the end of a terminal extending from an electrical component, such as a sintered tantalum anode. More particularly, facilities slidably supporting the welding chuck advance downwardly to advance the chuck and abut the end of the thin wire against the lead whereupon the wire is biased against the lead by the weight of the chuck. A rotatably and axially movable guide member having a passageway therethrough which is radially displaced from the axis of rotation thereof serves to guide a length of wire into a passageway in the chuck during return movement of the chuck. After the wire is received in the chuck passageway, the guide member is rotated whereupon the inner surfaces of both passageways at their juncture sever a predetermined length of wire in the chuck in anticipation of another cycle of operation of the overall machine.

A complete understanding of this invention may be had by reference to the following detailed description when considered in conjunction with the accompanying drawings, wherein:

FIG. 1 shows a supply of wire, a predetermined length of wire severed from the wire supply, and a sintered tantalum pellet having a projecting wire lead to which the severed wire is welded by the apparatus of the present invention;

FIG. 2 is a perspective view showing an apparatus for feeding, severing, and welding the predetermined length of wire to the lead extending from the pellet according to the present invention;

FIG. 3 is a perspective view, partially in cross section, of a portion of the machine of FIG. 2 particularly showing a rotatably and axially movable guide member in a first axial position for severing the wire held by a chuck;

FIG. 4 is a side view, partially in cross section, illustrating the guide member of FIG. 3 in a second axial position for compressing the chuck to release a wire gripping collet of the chuck to allow the chuck to retract onto and relative to the end of the supply of wire;

FIG. 5 is a side view, partially in cross section, depicting the guide member of FIGS. 3 tnd 4 in a third axial position, retracted from the chuck, thus allowing the chuck to move to a second position where it holds the severed wire against the lead extending from the pellet while the wire is welded to the lead;

FIG. 6 shows a control circuit for automatically operating the overall apparatus; and FIG. 7 is a timing diagram of one cycle of operation of the apparatus showing the relative time of operation of the components of the apparatus.

Referring to FIG. 1, wherein a general understanding may be had of the results to be accomplished by the apparatus of the invention. A nickel wire 11 is advanced from a supply spool 12 and a predetermined length of this wire 13 is severed. Then, the severed wire 13 is advanced into abutment with a tantalum wire lead or terminal 16 extending from a sintered tantalum pellet 17, whereupon the severed wire 13 is welded to the lead 16.

Considering now FIG. 2, the apparatus is shown mounted on a table 20. A first V-shaped jaw 21 projects from a block 22 slidably mounted between two guideways 25—25 secured to a plate 26 which is supported on an insulating sheet 27 attached to the table 20. A piston rod 30 projecting from an air cylinder 31 mounted on the plate 26 is connected to the slide block 22. A second V-shaped jaw 32 projects from a block 33 rotatably mounted on a stud shaft 34 depending from an arm 36 extending from the plate 26. A link 37 pivotally connects the slidable block 22 to the rotatable block 33, so that when the slidable block 22 is advanced by the piston rod 30, the link 37 rotates the block 33 about stud shaft 34 to close the jaws 21 and 32 to grip a wire lead 16.

Adjacent to the table 20 there is a conveyor or turntable 40 having a holder 41 for receiving a tantalum pellet 17 with the lead 16 extending upwardly therefrom. The conveyor 40 and holder 41 may be of the type shown in applicant's copending application, Ser. No. 465,433 filed June 21, 1965. As explained in that application, the conveyor 40 and holder 41 are cyclically indexed by a mechanism (not shown) to position each of a succession of leads 16 between the two V-shaped jaws 21 and 32. Now when the V-shaped jaws 21 and 32 close, the lead 16 is accurately positioned within the apparatus.

The table also supports a vertical guide standard 42 having a vertical dove-tail guideway 45 for receiving and slidably supporting a dove-tail block 46 attached to a horizontal platform 47 extending over the conveyor 40. An air cylinder 50 mounted on the table 20 has a projectable piston rod 51 connected to the platform 47 for moving the platform upwardly from the tantalum pellet 17 and lead 16 when the air cylinder 50 is actuated and downwardly when the air cylinder 50 is released.

Referring now to FIG. 3, a support housing or sleeve 52 projects downwardly from the lower surface of the platform 47. At the lower end of the sleeve 52 a flange 55 extends inwardly for supporting a chuck 56 which is slidable within the sleeve 52. This chuck 56 comprises collar 60 threaded onto a threaded section of a collet 61. The collar has a passageway 57 for receiving the wire which also extends through the collet 61. A spring 62 is interposed between the collar 60 and an inwardly extending beveled lip 65 of an annular collet actuator 66. The spring exerts a force against the lip 65 to urge the beveled lip 65 against mating beveled portions of resilient spring jaws of the collet 61; thus, the collet 61 holds the end of the wire 11 in register with the tantalum wire lead 16 held by the V-shaped jaws 21 and 32.

A tubular guide member 67 is mounted in a bushing 70 extending through the platform 47 for rotatable and axial movement within the sleeve 52. The guide member 67 has a passageway 71, which is radially displaced or offset from the axis of rotation of the guide member 67 and through which the wire 11 extends into the chuck passageway 57.

A plate 72 is secured to the upper end of the guide member 67. Interposed between the bottom of the plate 72 and the top of the platform 47 is a spring 77 urging the plate 72 away from the platform 47; thus tending to move the guide member 67 upwardly within the sleeve 52 away from the chuck collar 60. One end of a lever 80, pivotally mounted on brackets 81 secured to the top of the platform 47, bears against the upper surface of the upwardly urged plate 72, thus controlling the axial movement of the guide member 67 within the sleeve 52. The lever 80 is provided with a cam follower 82 which rides on a cam bar 85 that is attached to a spring-biased piston rod 86 projecting from an air cylinder 87 mounted on the top of the platform 47, as shown in FIG. 2.

When the platform 47 is at its upward position, as shown in FIGS. 2 and 3, and when the air cylinder 87 is released, the cam bar 85 moves to the left into engagement with a cam projection 90 mounted on an arm 91 extending from the guide standard 42. The projection 90 positions the cam bar 85, the lever 80, the plate 72, and the guide member 67 such that the guide member 67 is in abutment with the chuck collar 60, but the chuck 56 is still maintained in the gripping condition; that is, the spring-urged cam actuator 65 bears against the chuck collet 61 to hold the wire 11.

The plate 72 may be rotated for effectuating a severing of the wire 11 by a piston rod 92 pivotally connected to the plate 72 and extending from an air cylinder 93 mounted on the platform 47. When the air cylinder 93 is actuated, the piston rod 92 rotates the plate 72 and the guide member 67 within bushing 70 to move the guide passageway 71 relative to the collar passageway 57; thus, the internal surfaces of these passageways 57 and 71 at their junction act as shearing dies for severing the wire 11.

Referring again to FIG. 2, there is shown the wire 11 being fed from the spool 12 which is rotatably mounted on brackets 94 extending from the standard 42, and through an anti-retrograde device 95 also mounted upon the standard 42. This device 95 includes a spring-biased pinch bar 96 which allows movement of the wire 11 through the device 95 but precludes movement of the wire back toward the spool.

The wire 11 extends down from the device 95 into the guide passageway 71. A clamping bar 97 is pivotally mounted on a frame 98 secured to plate 72 and serves to grip the wire 11 to prevent movement of the wire 11 with respect to the guide member 67. Now when the platform 47 and guide member 67 move downwardly, a predetermined length of wire 11 is pulled by the clamping bar 97 from the supply spool 12 through the device 95.

Also, when the platform 47 moves downwardly, the cam bar 85 moves out of engagement with the cam projection 90, thus the released spring-biased piston rod 86 moves the cam bar 85 further to the left. The guide member 67 is then allowed to retract to a position spaced from the chuck collar 60, as shown in FIG. 5. During this downward movement of the platform 47, the severed wire 13 is held by chuck 56 and moves into abutment against the lead 16. Thus, as the platform 47 moves to its lowermost position, the sleeve 52 and flange 55 will move downwardly relative to the now stationary chuck 56 leaving the chuck 56 supported by the wire 13 and lead 16 in a position spaced above the flange 55.

An electrical welding current source 100 is connected by wire leads 101—101 to the chuck 56 and lead positioning jaws 21 and 32. Actuation of the electrical welding source 100 resistance welds the abutting wire 13 and lead 16. Downward movement of the chuck 56 and severed wire 13 relative to the sleeve 56 by the force of gravity is permitted to compensate for melting back of the severed wire 13 and lead 16 during the welding operation.

After the welding operation, the wire 11 is released by a piston rod 102, projecting from an air cylinder 103 mounted on the platform 47, which is actuated to lift the clamping bar 97 to release the wire 11, as shown in FIG. 2. Also at this time, the air cylinder 87 and piston rod 86 are actuated to pivot the lever 80 and move the guide member 67 to abut and compress the chuck 56 to open the collet 61, as shown in FIG. 4. Now movement of the platform 47 in an upward direction moves the guide member 67 and chuck 56 relative to the wire 11 held by the pinch bar 96, whereupon the guide member 67 guides the end of the wire 11 into the passageway 57 of the moving chuck 56.

*Control and operation*

The sequence of operation of the apparatus is controlled by a cam mechanism, as shown in FIG. 6. Cams 106–112 mounted on a shaft 114 rotated by a motor 115 operate respective contacts 117–123. The contacts 117–123 actuate respective relays or solenoids 125–131 which are effective through suitable valves or switches (not shown) to actuate the platform air cylinder 50, camming bar air cylinder 87, severing air cylinder 76, wire clamping air cylinder 103, lead positioner air cylinder 31, welding source 100, and a conveyor indexing air cylinder (not shown), respectively.

The sequence of operation of the components of the apparatus may be understood from the timing diagram of FIG. 7 when considered in conjunction with the circuit diagram of FIG. 6. Assume, first, that a section of wire 11 is positioned within guide member 67 and a severed section of wire 13 is gripped by the chuck 56.

First, an anode 17 with a projecting lead 16 is indexed into the machine. The cam 112 closes the contacts 123 to energize a solenoid 131 to actuate a valve (not shown) and operate the indexing mechanism (not shown). This mechanism indexes the conveyor 40 to advance a holder 41 with the anode 17 and lead 16 into the apparatus.

Then, the cam 106 opens contacts 117 to de-energize solenoid 125 to open a valve (not shown) to release the platform air cylinder 50 and move the platform 47 downwardly. As the platform 47 moves downwardly, the camming bar 85 moves out of engagement with the cam projection 90, thus the released air cylinder 87 and spring-biased piston rod 86 move the camming bar to the left, as viewed in FIG. 5, permitting the guide member 67 to move under the urging of the spring 77 relative to the sleeve 52 to a position spaced above the chuck collar 60.

During the descent of the platform and guide member, the wire clamp 97 on the plate 72 is gripping the end of the wire 11. Thus, a predetermined length of wire 11 is pulled from the supply spool 12 through the device 95.

Simultaneous to the release of the platform air cylinder 50 the cam 110 closes contacts 121 to operate the solenoid 129 to actuate a valve (not shown) and admit air to the lead positioner air cylinder 31 and piston 30. The actuated piston 30 moves the block 22 and link 37 to rotate the block 33 to close the V-shaped jaws 21 and 32 and accurately position the lead 16 with respect to the descending severed wire 13 held by the chuck collet 61.

Now, as the descending severed wire 13 held by the chuck 56 abuts the lead 16, the sleeve 52 continues to move downwardly relative to the chuck 56. Thus, the weight of the chuck 56 biases the severed wire 13 against the lead 16. While the severed wire 13 is biased against the lead 16, the cam 111 closes the contacts 122 to energize the weld relay 130 to pass a current through the leads 101, the abutting severed wire 13, and the lead 16 for resistance welding the wire 13 and lead 16 together. If the wire 13 or lead 16 melt back during the welding, the chuck 56 and wire 13 move downwardly within the sleeve 52 to compensate for the melt back.

After the welding operation, the welded wire 13 is released by the cam 107 closing contacts 118 to energize the solenoid 126 and actuate a valve (not shown) to operate the camming bar air cylinder 87. The actuated piston 86 moves the camming bar 85 and lever 80 to move the guide member 67 downwardly within and relative to the sleeve 52. The guide member 67 abuts against the collar 60 to move the collet 61 downwardly with respect to the actuator beveled lip 65, as shown in FIG. 4, to open the collet 61 to release the welded wire 13.

Simultaneous to the release of the welded wire 13, the wire 11 is released by the cam 109, closing contacts 120 to energize the solenoid 128 to actuate a valve (not shown) and operate the air cylinder 103 and piston 102. The actuated piston 102 raises the wire clamping bar 97 to release the wire 11.

Then, cam 106 closes contacts 117 to energize the solenoid 125 to actuate a valve (not shown) and operate the air cylinder 50 to raise the platform 47. As the platform 47 raises, the guide member 67 and chuck 56 move upwardly relative to the wire 11 held by the pinch bar 96; whereupon the stationary end of the wire 11 is positioned by the passageway 71 of the moving guide member 67 such that the chuck 56 moves onto the end of the wire 11.

When the platform 47 reaches its upward position, the cam 107 opens the contacts 118 to de-energize solenoid 126 and release the camming bar air cylinder 87 and piston rod 86. The spring-biased piston rod 86 moves the camming bar 85 to the left, as viewed in FIG. 3, to engage the cam projection 90. The moving camming bar 85 and the lever 80 allow the spring 77 to move the guide member 67 upwardly within and relative to the sleeve 52 to close the collet 60 within the actuator 66 to grip the wire 11. The cam projection 90 positions the camming bar 85, the lever 80, and guide member 67 to hold the guide member 67 in engagement with the chuck collar 60.

After the chuck 56 grips the wire 11, the cam 108 closes the contacts 119 to energize solenoid 127 to actuate a valve (not shown) to operate the air cylinder 93 and piston rod 92. The actuated piston rod 92 pivots the plate 72 and guide member 67, thus a predetermined length of wire 13 in the chuck passageway 57 is severed from the wire 11 when the guide passageway 71 moves transverse to the collar passageway 57.

While the platform 47 is moving upwardly, the welded anode 17 and lead 16 is removed from the apparatus and another anode 17 and lead 16 is indexed into the apparatus. The cam 110 opens the contacts 121 to de-energize the solenoid 129 and release the air cylinder 31 and piston rod 30 to move the block 22 and rotate the block 33 to open the V-shaped jaws 21 and 32 and release the welded lead 16. Then the cam 112 closes the contacts 123 to energize the solenoid 131 to actuate the conveyor indexing mechanism to advance another lead 16 between the V-shaped jaws 21 and 32.

Subsequent to the conveyor indexing and the operation of the severing air cylinder 93, the cams 106-112 rotated by the motor 115 initiate and control another cycle of operation of the machine.

It is to be understood that the above-described embodiment is illustrative of the principles of the invention and many others could be devised without departing from the scope of this invention.

What is claimed is:
1. In an apparatus for welding a wire onto an article;
   a collet for gripping the wire;
   a vertical support sleeve having an inwardly extending flange for slidably supporting said collet within said sleeve;
   means for advancing downwardly said support sleeve to move said collet to abut the end of the wire against said article whereupon the collet moves upwardly within and relative to said sleeve to bias the wire against said article by the weight of said collet; and
   means for applying welding current through said wire and article whereupon downward movement of said collet within and relative to said sleeve compensates for the melting back of the wire.

2. In an apparatus for feeding and severing a predetermined length of wire;
   a rotatably and axially movable guide member having a passageway therethrough radially displaced from the axis of rotation thereof;
   chuck means released by engagement with said guide member for gripping a wire positioned in a passageway therethrough;
   means for advancing axially said guide member to communicate said guide member passageway with said chuck passageway and to release said chuck means;
   means actuated upon the advance of said guide member for moving said guide member and said chuck with respect to said wire whereby a predetermined length of wire is received through said guide member passageway into said chuck passageway; and
   means actuated upon moving of said guide member and chuck with respect to said wire for rotating said guide member to rotate said passageways out of alignment and thereby sever said predetermined length of wire in said chuck.

3. In an apparatus for welding lengths of wire to a succession of terminals extending from electrical components;
   a normally closed collet means for receiving and gripping a length of wire extending from a supply;
   a severing die mounted for movement relative to said collet means to open said collet means and for movement transverse to said collet means to sever the wire received in said collet means;
   means for intermittently advancing a succession of said electrical components to position each terminal extending therefrom in alignment with the wire received in said collet;
   means actuated upon each operation of said intermittent advancing means for moving said severing die transverse of said collet means to sever a wire received in said collet means;
   means rendered effective following each operation of said severing die for reciprocating said collet means to advance said severed wire into engagement with said terminal;
   means for gripping and advancing the unsevered wire with said collet means;
   means for applying welding current to said engaged wire and terminal; and
   means rendered effective after application of said welding current for moving said severing die relative to said collet means to release said gripped wire only while said collet means is reciprocated back to the initial position to receive another length of said wire into said collet means.

4. In an apparatus for severing and advancing a section of wire;
   a collet for receiving one end of an indeterminate length of wire;
   an annular actuator slidably mounted on said collet for holding said collet in a closed position to grip the wire;
   a sleeve having an inwardly projecting flange for receiving and supporting said annular actuator;

a guide member mounted within said sleeve for rotary and axial movement;

said guide member having a passageway therethrough communicating with said collet but offset with respect to the axis of rotation of said guide member for receiving and guiding said wire into said collet;

means for gripping and holding the indeterminate length of wire for movement with said guide member;

means for rotating said guide member to sever the wire at the juncture of said guide member and collet;

means operated after the severance of said wire for moving said sleeve to advance said guide member and collet to advance both the indeterminate length of wire and the severed section of wire;

means rendered effective following advance of the sleeve for axially moving the guide member to move the collet relative to said annular actuator to release the severed section of wire; and means for sequentially releasing the gripper and restoring the sleeve to the initial position to move the collet and guide member relative to the unsevered wire whereupon the end of the indeterminate length of wire is received in said collet.

5. In an apparatus for welding section of wire from a continuous indeterminate length onto an article;

a collect for gripping an end of said indeterminate length of wire positioned in a passageway therethrough along the axis thereof;

a feed guide initially abutting said collect and having a passageway therethrough communicating with said collet passageway for guiding said wire into said collet;

means mounting said guide for movement transverse with respect to the collet axis;

means for closing said collet to grip the end of said wire;

means for moving said feed guide transverse to said collet to sever a section of wire in said collet from said indeterminate length of wire by the shearing of the inner surfaces of said passageways at their juncture;

means for gripping said indeterminate length of wire entering said wire guide;

means for advancing said collet and gripping means thereby advancing both said indeterminate length of wire and said section of wire to abut the end of said section of wire against said article;

means rendered effective upon said advance of said collect for applying welding energy between said section of wire and said article to effectuate a welding bond therebetween;

means rendered effective after the operation of said welding means for operating collet closing means and said wire gripping means to release said welded severed section of wire and the end of said indeterminate length of wire, respectively; and said advancing means including means rendered effective upon operation of said welding for retracting the collet from said welded section of wire into the initial position in abutting relation with said feed guide whereby the end of the indeterminate length of wire is received into said collet passageway.

6. In an apparatus for welding a section of wire onto a lead extending from a component;

a collet for gripping and holding an end of said wire projecting from the face of the collet;

means slidably supporting said collet in closed position to grip said wire;

means for advancing said supporting means to move said collet to abut said projecting wire against said lead whereupon said supporting means slides relative to said collet to leave said collet supported by said lead abutting said end of said wire;

means rendered effective upon said wire abutting said lead for applying welding current through said wire and terminal to effectuate a weld therebetween;

a tubular member mounted in said supporting means for both sliding and rotary movement;

said tubular member having a passageway therethrough for guiding wire into said collet, said passageway formed offset with respect to the axis of rotation of said tubular member;

means for moving said tubular member in said supporting means to abut and open said collet to release said welded wire;

means for returning the advancing means to the initial position to move said collet and tubular member relative to said wire; and means rendered effective upon restoration of said supporting means to the initial position for rotating said tubular member to sever the wire at a juncture of said tubular member and collet.

7. In an apparatus for abut welding a predetermined length of wire to an article;

a vertically movable support having a horizontally extending flange;

a chuck having a vertical passageway therethrough slidably mounted in said support for vertical movement upwardly from said flange upon which said chuck is initially resting;

means in said chuck for gripping an end of a wire in said chuck passageway;

a guide member having a vertical passageway therethrough mounted in said support for vertical and transverse movement with respect to said chuck;

means for moving downwardly said guide member with respect to said support to abut said chuck to communicate said guide passageway with said chuck passageway and to release said wire gripping means;

means rendered effective after the movement of said guide member into abutment with said chuck for moving upwardly said support with respect to the wire whereupon a predetermined length of wire is received through said guide passageway into said chuck pasageway;

means rendered effective after said upward movement of said support for operating said chuck wire gripping means;

means rendered effective after the operation of said chuck wire gripping means for moving said guide member transverse to said chuck to sever said predetermined length of wire extending into said chuck;

means rendered effective after the transverse movement of said guide member for moving upwardly said guide member in said support to a position spaced from said chuck;

means rendered effective upon the movement of said guide member to the position spaced from said chuck for moving downwardly said support to abut said severed wire against said article whereupon said chuck moves upwardly from said flange in said support to bias said severed wire against said article by the weight of said chuck;

means movable with said guide member for advancing downwardly a predetermined length of the unsevered wire; and means rendered effective upon the downward movement of said support for welding said severed wire to said article whereupon downward movement of said chuck in said support compensates for the melting back of said severed wire.

8. In an apparatus for butt welding a predetermined length of wire to a lead extending from a component;

a chuck having a vertical passageway therethrough;

means in said chuck for preventing movement of a wire in said chuck passageway only upon vertical decompression of said chuck;

a vertical sleeve having an inwardly extending flange for slidably supported said chuck;

a tubular member mounted in said sleeve for rotatable and axial movement, said tubular member having a passageway therethrough radially displaced from the axis of rotation thereof;

means for moving downwardly said tubular member in said sleeve to compress said chuck against said flange an to communicate said member passageway with said chuck passageway;

means rendered effective upon the downward movement of said tubular member of moving upwardly said sleeve with respect to said wire, whereby a predetermined length of wire is received through said member passageway into said chuck passageway;

means rendered effective after the upward movement of said sleeve for moving said tubular member upwardly in said sleeve to decompress said chuck to grip the wire while maintaining said member passageway communicating with said chuck passageway;

means rendered effective after the decompression of said chuck for rotating said tubular member to sever said predetermined length of wire at the juncture of the passageway in said chuck and tubular member;

means rendered effective after the severance of said wire for moving upwardly said tubular member in said sleeve to a position spaced from said chuck;

means rendered effective upon movement of said tubular member to a position spaced from said chuck for moving downwardly said sleeve to abut said severed wire against said lead whereupon said chuck moves upwardly within and relative to said sleeve to bias said severed wire against said lead by the weight of said chuck;

means movable with said guide for advancing downwardly a predetermined length of the unsevered wire; and means rendered effective upon the downward movement of said sleeve for welding said severed wire and lead together, whereupon downward movement of said chuck within said sleeve compensates for melting back of the severed wire and lead.

References Cited

UNITED STATES PATENTS 3,307,763  3/1967  Rasimenoks et al. _____ 140—112

RICHARD J. HERBST, *Primary Examiner.*

L. A. LARSON, *Assistant Examiner.*